G. TIEMANN.
EGG CASE.
APPLICATION FILED JUNE 28, 1919.

1,351,708. Patented Aug. 31, 1920.
2 SHEETS—SHEET 1.

Inventor
George Tiemann

Witnesses
W. A. Thomas

By Victor J. Evans
Attorney

G. TIEMANN.
EGG CASE.
APPLICATION FILED JUNE 28, 1919.

1,351,708.

Patented Aug. 31, 1920.
2 SHEETS—SHEET 2.

Witnesses
R. A. Thomas.

Inventor
George Tiemann

By Victor J. Evans
Attorney

UNITED STATES PATENT OFFICE.

GEORGE TIEMANN, OF JOLIET, ILLINOIS, ASSIGNOR OF ELEVEN PER CENT. TO FRED A. MUENTNICH, OF JOLIET, ILLINOIS.

EGG-CASE.

1,351,708.  Specification of Letters Patent.  Patented Aug. 31, 1920.

Application filed June 28, 1919. Serial No. 307,436.

*To all whom it may concern:*

Be it known that I, GEORGE TIEMANN, a citizen of the United States, residing at Joliet, in the county of Will and State of Illinois, have invented new and useful Improvements in Egg-Cases, of which the following is a specification.

This invention relates to new and useful improvements in egg cases and aims to provide a simple construction for the purpose of the storage and shipping of eggs in a manner to prevent their being broken by external shocks upon the outside of the case, or by contact of the eggs with one another.

Another object of the invention is the provision of a shipping case, which includes a plurality of egg receiving units, the latter being formed with cellular pockets or holders, and are preferably constructed of paper pulp pressed into proper shape, the cellular pockets or holders being preferably of frusto-conical shape and connected by restricted depressions to form other pockets or depressions upon the opposite face of the units. This permits of a reduction in the amount of space necessary for a given number of eggs and results in an economy of material and spaceful packing.

Other novel features and details of construction will appear as the following description is read in connection with the accompanying drawings.

In the drawings.

Referring to the drawings in detail, like characters of reference denote corresponding parts throughout the several views.

Figure 1:
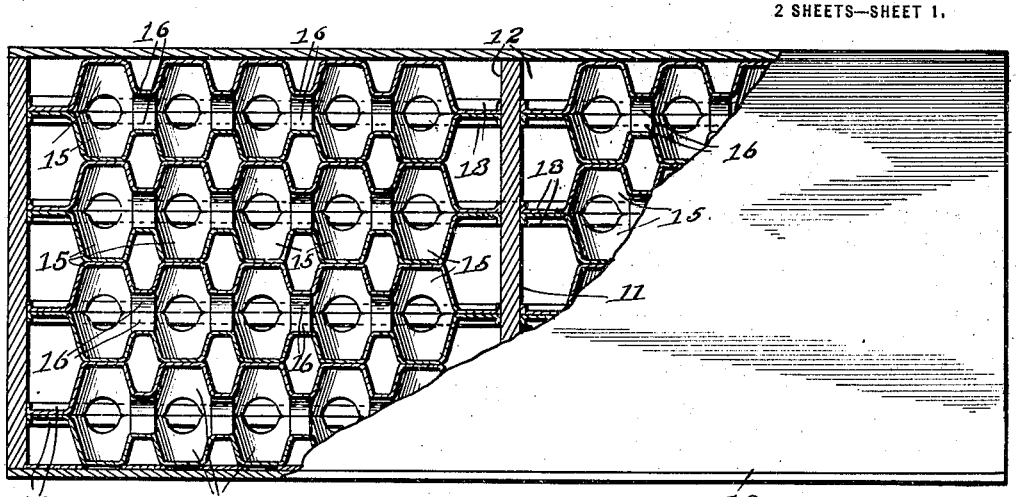
Figure 1 is a section through an egg case showing a number of containers or egg receiving units therein.
Figure 2:
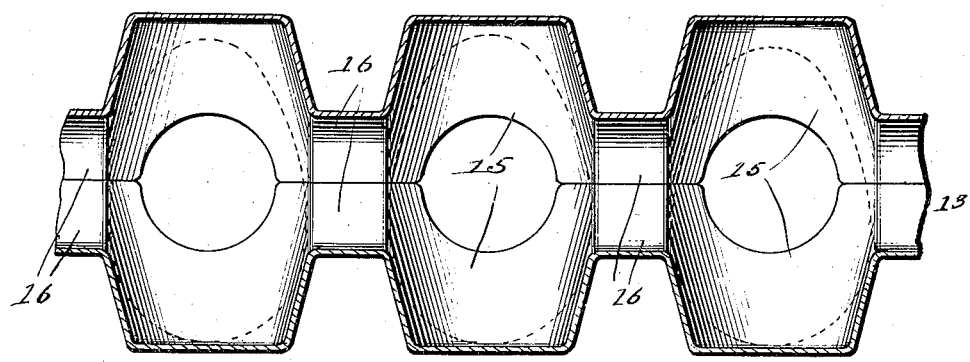
Fig. 2 is an enlarged section through two of the containers or units arranged one upon the other and having eggs shown therein by dotted lines.
Figure 3:
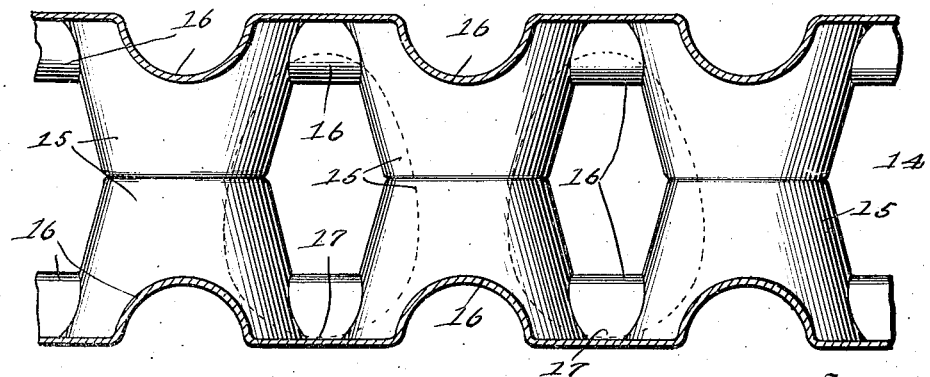
Fig. 3 is a similar view taken on a different line.
Figure 4:
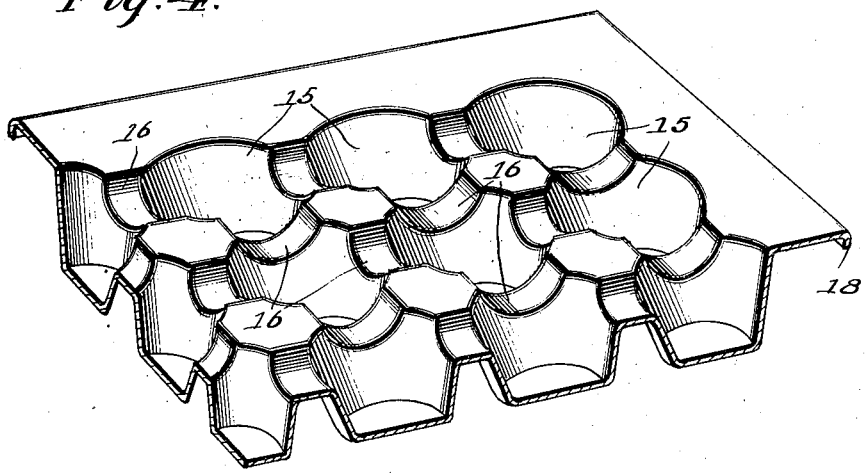
Fig. 4 is a perspective view of one of the egg container units.
Figure 5:
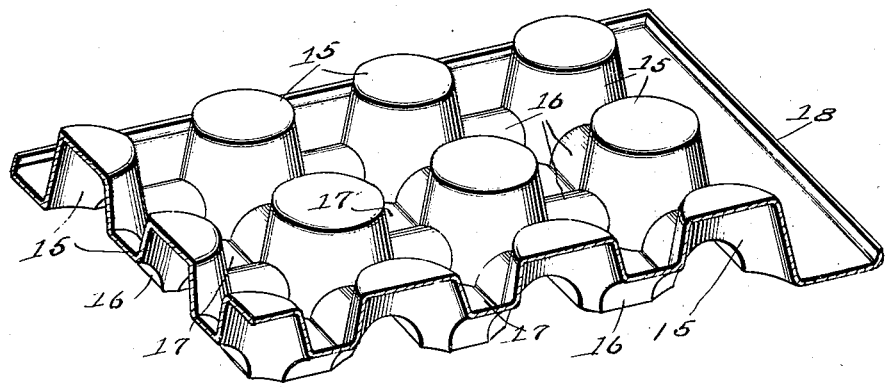
Fig. 5 is a similar view looking at the opposite side of the said units.

The case, which is indicated in the accompanying drawings by the reference numeral 10, may be of any approved or desired construction and is provided with the usual transverse partition 11, which divides the case into separate sections 12, each of which, as is usual in cases of this character, being adapted to receive fifteen dozen eggs, so that the case will contain a total of thirty dozen.

The invention resides in a novel form of egg container units, the latter being arranged in each of the sections 12 of the case in superimposed relation and being indicated by the reference characters 13 and 14.

Each of the egg container units is formed with a plurality of cellular holders or pockets 15, opening into one face thereof. These pockets are of frusto-conical formation and are spaced apart, as shown. The egg container units are preferably formed of paper pulp, so that the pockets 15 may be pressed therein and the container units may be of a single piece of material. Each of the pockets 15 are connected by a restricted depression 16, which together with the walls of the adjacent frusto-conical pockets, provide egg receiving pockets 17 in the opposite face of the container units, while the depression 16 also provide communication between said pockets 15 and act to space them apart.

Each egg is received in the pockets formed in the adjacent egg container units, preferably the unit 13 being provided with thirty of the pockets 15, while the adjacent section 14 is provided with only twenty of the said pockets, and as there are four of the units 13 and three of the units 14, there will be a total of one hundred and eighty eggs or fifteen dozen in each of the sections 12.

Each of the container units is provided around its edge with right angular flanges 18, so as to strengthen the same and prevent buckling.

By the use of the foregoing described invention, a thirty dozen case of eggs will be smaller and lighter, which results in a big saving of both cold storage and shipping space, as well as a saving in the cost of construction. It will also reduce breakage to a minimum and contains the additional advantage of having the eggs in such position within the pockets as to be readily removed, there being a sufficient portion of the egg projecting to permit of its being easily picked up.

The invention is susceptible of various changes in its form, proportions and minor details of construction and the right is herein reserved to make such changes as properly fall within the scope of the appended claims.

Having described the invention, what is claimed is:

1. An egg case comprising a receptacle, egg container units therein, said container units being formed with spaced egg receiving portions arranged in superimposed relation with the pockets of adjacent upper and lower units staggered and air circulating passages between the pockets.

2. An egg case comprising a receptacle, egg container units therein, said container units having spaced frusto-conical egg receiving pockets in one face thereof and restricted depressions connecting each of said pockets to define spaced egg receiving pockets in the opposite face of said units and form communicating air passages between the first mentioned pockets, the units being arranged in superimposed relation with the frusto-conical pockets of adjacent units offset, whereby each egg will be received within a frusto-conical pocket of one unit and a pocket formed between the frusto-conical portion of the adjacent unit with the spaces between the first mentioned pockets providing communication between the second mentioned pockets.

In testimony whereof I affix my signature.

GEORGE TIEMANN.